(12) United States Patent
Lückemeier

(10) Patent No.: US 10,008,844 B2
(45) Date of Patent: Jun. 26, 2018

(54) CABLE SEAL

(71) Applicant: HARTING ELECTRONICS GMBH, Espelkamp (DE)

(72) Inventor: Martin Lückemeier, Diepenau (DE)

(73) Assignee: HARTING Electronics GmbH, Espelkamp (DE)

( * ) Notice: Subject to any disclaimer, the term of this patent is extended or adjusted under 35 U.S.C. 154(b) by 0 days. days.

(21) Appl. No.: 15/555,048

(22) PCT Filed: Feb. 15, 2016

(86) PCT No.: PCT/DE2016/100069
§ 371 (c)(1),
(2) Date: Aug. 31, 2017

(87) PCT Pub. No.: WO2016/141921
PCT Pub. Date: Sep. 15, 2016

(65) Prior Publication Data
US 2018/0041019 A1    Feb. 8, 2018

(30) Foreign Application Priority Data
Mar. 6, 2015    (DE) .......................... 10 2015 103 274

(51) Int. Cl.
H02G 15/02    (2006.01)
H02G 15/013    (2006.01)
H02G 3/08    (2006.01)

(52) U.S. Cl.
CPC .......... *H02G 15/013* (2013.01); *H02G 3/088* (2013.01)

(58) Field of Classification Search
CPC ...... H02G 15/013; H02G 3/088; H02G 15/00; H02G 15/007; H02G 15/04
USPC .... 174/77 R, 68.3, 250, 251, 254, 255, 258, 174/268
See application file for complete search history.

(56) References Cited

U.S. PATENT DOCUMENTS 3,258,520 A    6/1966    Jarvis
4,903,972 A    2/1990    Ombredane

FOREIGN PATENT DOCUMENTS

DE    87 00 327 U1    2/1987
DE    44 15 119 A1    11/1995
EP    0 264 203 A2    4/1988

OTHER PUBLICATIONS

International Preliminary Report on Patentability, dated Sep. 12, 2017, for International Application No. PCT/DE2016/100069, 5 pages. (English Translation).
German Office Action, dated Oct. 26, 2015, for German Application No. 10 2015 103 274.0, 5 pages.
International Search Report and Written Opinion, dated Sep. 9, 2016, for International Application No. PCT/DE2016/100069, 10 pages. (with English Translation of Search Report).

*Primary Examiner* — Tremesha S Willis
(74) *Attorney, Agent, or Firm* — Seed IP Law Group LLP

(57) ABSTRACT

A cable seal for feed-throughs on housings is provided. Cables or hoses are fed through the feed-through into the housing and are sealed by two sealing rings. Because of different diameters of the sealing rings, the sealing rings are radially expanded or compressed by an axial force and the cable is sealed to the housing tightly with respect to the surroundings. The axial force on the sealing rings is produced by a pressing element that can be screwed on.

10 Claims, 2 Drawing Sheets

CABLE SEAL

BACKGROUND

Technical Field

This disclosure is related to a sealing arrangement for sealing cables and hoses to a housing.

Description of the Related Art

Sealing arrangements of the aforementioned type are required in the region of feedthroughs in order to seal cables or hoses that are inserted into a housing against environmental influences such as, for example, dust, dirt and moisture. These environmental influences are not to penetrate into the housing in the region of the feedthrough.

A plurality of seals for cables and hoses are known from the prior art. Cables are mostly sealed by means of sealing rings, sealing discs or specifically embodied seals.

DE 87 00 327 U1 discloses a gland seal-type arrangement for sealing cable feedthroughs for synthetic material insulated high voltage cables. The arrangement comprises a multi-part sealing body, a gland seal component and a pressure piece having a ring nut.

U.S. Pat. No. 3,258,520 discloses a device that is used as a feedthrough for electrical accessories and comprises two seals that are arranged spaced from one another.

For each feedthrough and cable, the seals are embodied in a particularly complex manner and are complex and also expensive to produce.

BRIEF SUMMARY

Embodiments of the present invention render it possible to provide a sealing arrangement for sealing cables and hoses, wherein standardized sealing elements are to be used as much as possible in order to keep additional costs low.

Embodiments of the invention provide a sealing arrangement for cables and hoses that are inserted into a housing and are to be sealed with respect to said housing. The sealing arrangement is formed from a feedthrough on the housing and a pressure element. The pressure element can be screwed onto the housing on the end of the feedthrough or can be screwed into the housing.

For this purpose, the housing and pressure element are fitted with corresponding threads. The pressure element is advantageously embodied as a ring, wherein said ring comprises a central opening through which a cable or hose can be inserted through the pressure element. In the case of a pressure element that is screwed in or screwed on, the opening of the pressure element and the feedthrough are oriented in alignment with respect to one another so that a cable or hose can be inserted through the two components into the housing.

An annular, first pressure surface is provided on the end of the feedthrough. The first pressure surface faces the pressure element. A likewise annular, second pressure surface is provided on the pressure element. The second pressure surface faces the housing and the first pressure surface. As a result of which a pressure region is formed between the first pressure surface and the second pressure surface. The pressure region is variable in size according to the extent to which the pressure element is screwed into/onto the housing.

Two sealing rings, one first sealing ring and one second sealing ring (so-called O-rings) are arranged in the pressure region. The first sealing ring is dimensioned as smaller in diameter than the second sealing ring. However, the inner diameter of the first sealing ring is not larger than the outer diameter of the second sealing ring. In an advantageous embodiment, the second sealing ring is measured as smaller from the inner diameter than the feedthrough of the housing. However, the outer diameter of the second sealing ring is larger than the feedthrough.

Expediently, the second sealing ring is dimensioned in such a manner that it sits under slight tension on a cable or a hose that is inserted into the housing through the feedthrough. The first sealing ring sits under slight tension in the pressure region between the first pressure surface and the second pressure surface.

The pressure surfaces are brought closer to one another and the pressure region is compressed by further screwing the pressure element into/onto the housing. The first sealing ring and the second sealing ring are pressed onto one another by way of the first pressure surface and the second pressure surface. The sealing rings are deflected over their outer surface away from one another by the different diameters of the sealing rings. This leads to a radial expansion of the first sealing ring and a radial compression of the second sealing ring.

The sealing rings provide a seal against environmental influences and with respect to one another and also with respect to the pressure surfaces, the cable/hose, and the feedthrough by the compression of the second sealing ring and the expansion of the first sealing ring.

In a specific embodiment, one or both of the two pressure surfaces are not parallel to one another but rather are arranged at an angle with respect to one another. As a consequence, it is possible to improve the compressing arrangement of the first sealing ring on the feedthrough and/or the second sealing ring on the cable/hose.

BRIEF DESCRIPTION OF THE SEVERAL VIEWS OF THE DRAWINGS

Three exemplary embodiments of the invention are illustrated in the drawings and further explained hereinunder. In the drawings.

The figures include schematic illustrations that are partially simplified. In part, identical reference numerals are used for identical, but where appropriate, non-identical elements. Various views of identical elements could be scaled differently.

DETAILED DESCRIPTION

Figure 1:
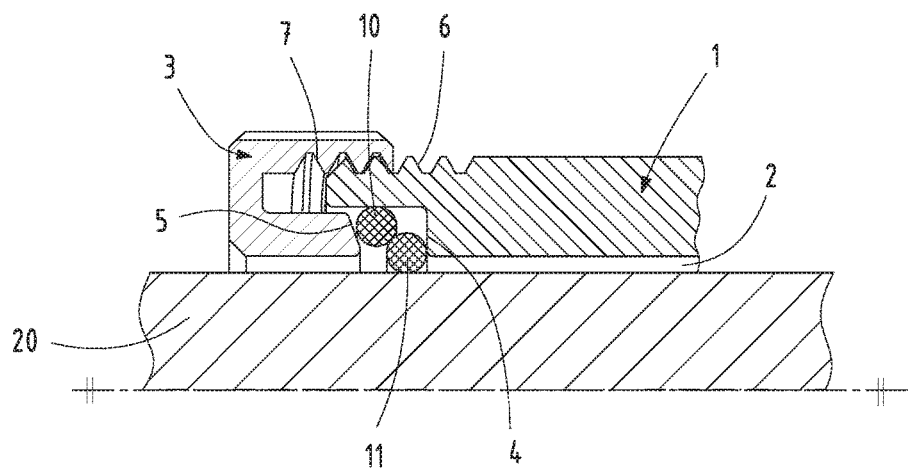
FIG. 1 illustrates a sectional view of a cable sealing arrangement in accordance with an embodiment of the invention in the opened state.

FIG. 1 illustrates a cable sealing arrangement in accordance with an embodiment of the invention in a sectional view. In the lower region of FIG. 1, a cable 20 is illustrated that is received in a feedthrough 2 of a housing 1. An outer thread 6 is embodied on the left-hand side end of the feedthrough 2 on the housing 1. A pressure element 3 having a corresponding inner thread 7 is screwed onto the outer thread 6 of the feedthrough 2 on the housing 1.

The housing 1 forms a first pressure surface 4 on the left-hand side end of the feedthrough 2. The first pressure surface 4 lies opposite a second pressure surface 5. The second pressure surface 5 is formed on the pressure element 3. The gap between the first pressure surface 4 and the second pressure surface 5 that forms a pressure region can be regulated by screwing the pressure element 3 onto the housing 1 or unscrewing the pressure element 3 from the housing 1.

In accordance with embodiments of the invention, two sealing rings 10, 11 are arranged in the pressure region between the first pressure surface 4 and the second pressure surface 5. The first sealing ring 10 has a larger diameter than the second sealing ring 11.

The second sealing ring 11 is dimensioned in such a manner that its inner diameter is smaller than the diameter of the feedthrough 2. The second sealing ring 11 expediently sits under slight tension on the cable 20 that is to be sealed.

The first sealing ring 10 is provided with an inner diameter that does not exceed the outer diameter of the second sealing ring 11. A sealing arrangement can thus be ensured between the first sealing ring 10 and the second sealing ring 11.

In the specific, illustrated embodiment, the second pressure surface 5 is configured in such a manner that it is on a slant, which renders possible an improved sealing arrangement of the first sealing ring 10.

In the illustrated state, the pressure element 3 is slightly screwed on so that a force is not exerted by the pressure surfaces 4, 5 onto the sealing rings 10, 11 and the screw connection is opened and unsealed. A closed cable sealing arrangement is illustrated in FIG. 2.

Figure 2:
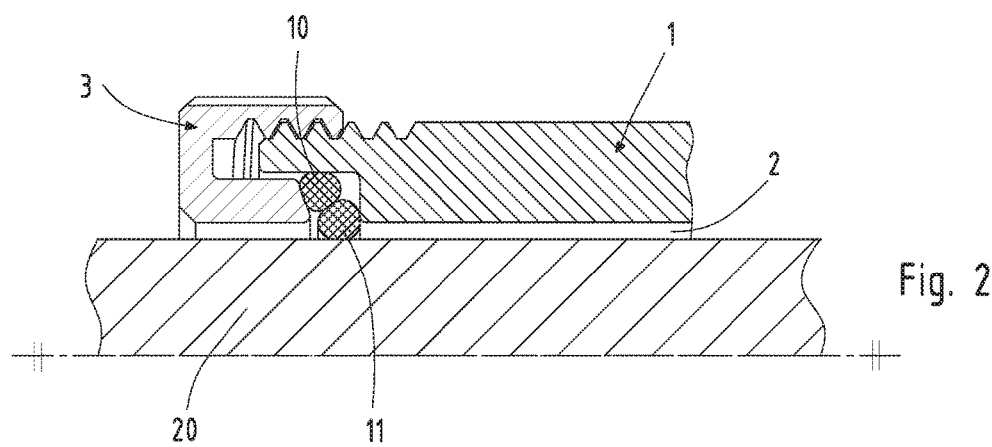
FIG. 2 illustrates a sectional view of the cable sealing arrangement of FIG. 1 in the closed state.

FIG. 2 illustrates the cable sealing arrangement in FIG. 1, wherein the pressure element 3 is further screwed onto the housing 1. The first sealing ring 10 and the second sealing ring 11 are pressed together between the pressure surfaces 4, 5.

As a result of the different diameters of the sealing rings 10, 11, said sealing rings 10, 11 deflect over their outer surface in such a manner that the larger, first sealing ring 10 is deflected radially outwards and the smaller, second sealing ring 11 is deflected radially inwards. A sealing arrangement is thus produced between the sealing rings 10, 11, cable 20, housing 1 and pressure element 3. Since the sealing rings 10, 11 deform owing to their elasticity, a larger sealing surface is produced on the contact sites.

Figure 3:
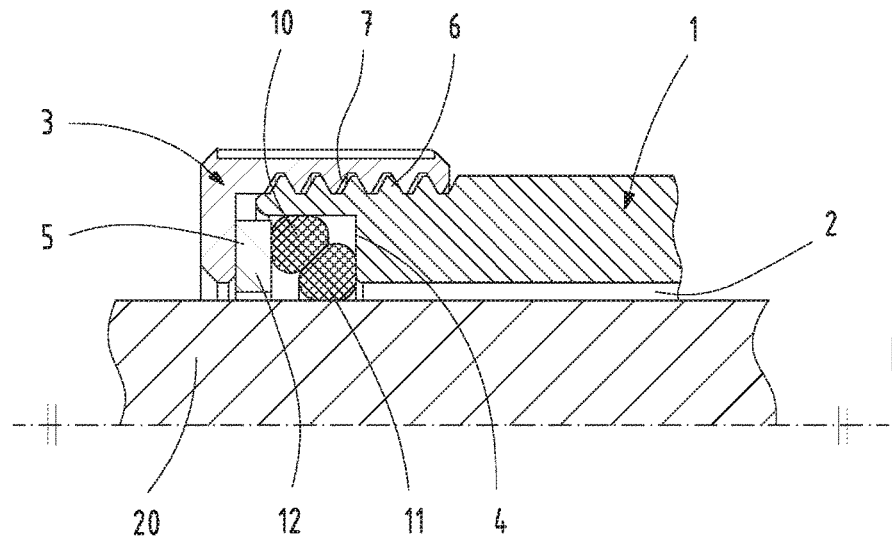
FIG. 3 illustrates a sectional view of a cable sealing arrangement in accordance with another embodiment of the invention in the closed state.

A cable sealing arrangement in accordance with another embodiment of the invention is illustrated in a sectional view in FIG. 3. In this specific embodiment, a decoupling device 12 is arranged between the second pressure surface 5 and the first sealing ring 10.

The decoupling device 12 is provided for the purpose of only transferring the axial force from the pressure element 3 to the sealing rings 10, 11. The decoupling device 12 is arranged in a rotatable manner with respect to the pressure element 3 as a result of which it is not possible to transmit torque from the pressure element 3 to the sealing rings 10, 11 if said pressure element 3 is screwed onto the housing 1. The decoupling device 12 is to be selected from a material in such a manner that as little friction as possible is produced between the pressure element 3 and the decoupling device 12.

Figure 4:
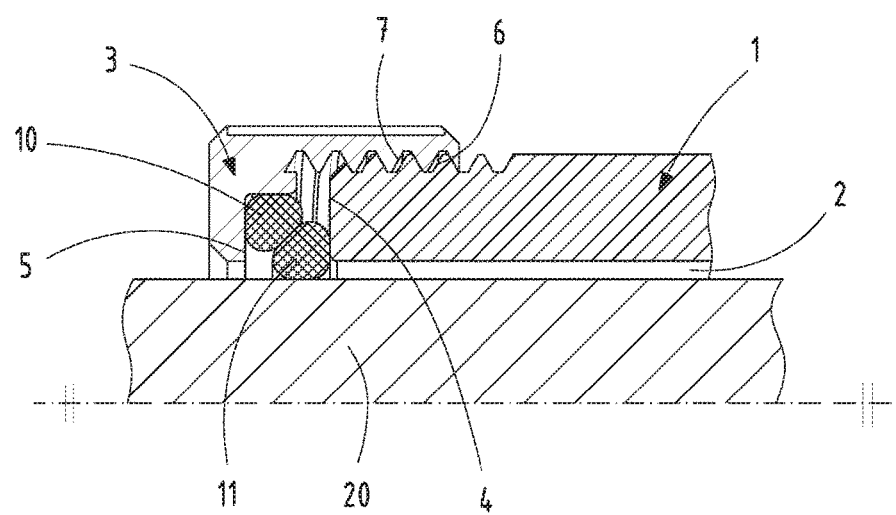
FIG. 4 illustrates a sectional view of a cable sealing arrangement in accordance with yet another embodiment of the invention in the closed state.

A further cable sealing arrangement in accordance with yet another embodiment of the invention is likewise illustrated in a sectional view in FIG. 4. In the case of the illustrated cable sealing arrangement, the pressure region on the end of the feedthrough 2 is merely encompassed on one side by the housing 1. In the exemplary embodiments in FIGS. 1 to 3, a stepping arrangement is formed on the housing 1 on the inner side of the feedthrough 2, said stepping arrangement forming the first pressure surface 4 and the pressure region for receiving the sealing rings 10, 11.

In this exemplary embodiment of FIG. 4, the pressure region is encompassed on two sides by the pressure element 3 and only on one side by the first pressure surface 4 of the housing 1. The fourth side is in each case formed by means of the cable 20 that is to be sealed.

It is possible by this arrangement of a pressure element 3 on a feedthrough 2 of a housing 1 to still use standardized sealing rings 10, 11 (so-called O-rings) so as to produce a sealing arrangement without it being necessary to produce specific sealing rings. Moreover, the arrangement of two sealing rings of different sizes renders it possible to seal different cable diameters or hose diameters without it being necessary to store different sealing element sizes.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A sealing arrangement for sealing cables and hoses to a housing, comprising a feedthrough in the housing and a pressure element,
   wherein the pressure element can be screwed onto the housing or can be screwed into the housing at one end of the feedthrough,
   wherein a first pressure surface is embodied on the feedthrough and an opposite-lying, second pressure surface is embodied on the pressure element,
   wherein a pressure region is embodied between the first pressure surface and the second pressure surface,
   wherein a first sealing ring and a second sealing ring are arranged between the first pressure surface and the second pressure surface,
   wherein the first and second sealing rings are embodied as a rotation torus, and
   wherein a sealing arrangement is provided between the first and second sealing rings, the sealing arrangement resulting from the first and second sealing rings being pressed together in direct contact with each other as a result of movement of the pressure element.

2. The sealing arrangement according to claim 1, wherein the first sealing ring comprises a larger inner diameter than the second sealing ring.

3. The sealing arrangement according to claim 2, wherein the inner diameter of the first sealing ring is smaller than an outer diameter of the second sealing ring.

4. The sealing arrangement according to claim 3, wherein an outer diameter of the first sealing ring is larger than the outer diameter of the second sealing ring.

5. The sealing arrangement according to claim 4, wherein the inner diameter of the second sealing ring is smaller than a diameter of the feedthrough.

6. The sealing arrangement according to claim 1, wherein the first and second sealing rings are embodied from an elastic polymer.

7. The sealing arrangement according to claim 1, wherein the pressure element is embodied as a ring.

8. The sealing arrangement according to claim 1, wherein a decoupling device is arranged on the second pressure surface and said decoupling device can rotate with respect to the second pressure surface.

9. The sealing arrangement according to claim 8, wherein the decoupling device is embodied as a planar ring.

10. A sealing arrangement for sealing a cable or a hose to a housing having a feedthrough through which the cable or the hose passes, the sealing arrangement comprising:
- a pressure element that is configured to be screwed onto or into the housing at one end of the feedthrough;
- a first sealing ring embodied as a rotation torus and arranged between the housing and the pressure element; and
- a second sealing ring embodied as a rotation torus and arranged between the housing and the pressure element, and
- wherein a sealing interface is provided between the first and second sealing rings, the sealing interface resulting from the first and second sealing rings being pressed together in direct contact with each other as a result of movement of the pressure element relative to the housing.

* * * * *